US 010295003 B2

(12) United States Patent
Crippa et al.

(10) Patent No.: US 10,295,003 B2
(45) Date of Patent: May 21, 2019

(54) CALIPER ASSEMBLY FOR A DISC BRAKE

(71) Applicant: FRENI BREMBO S.P.A., Curno, Bergamo (IT)

(72) Inventors: Cristian Crippa, Curno (IT); Enrico Ongaretti, Curno (IT); Andrea Teruzzi, Curno (IT)

(73) Assignee: Freni Brembo S.P.A, Curno, Bergamo (IT)

( * ) Notice: Subject to any disclaimer, the term of this patent is extended or adjusted under 35 U.S.C. 154(b) by 0 days.

(21) Appl. No.: 15/577,443

(22) PCT Filed: May 24, 2016

(86) PCT No.: PCT/IB2016/053034
§ 371 (c)(1),
(2) Date: Nov. 28, 2017

(87) PCT Pub. No.: WO2016/189461
PCT Pub. Date: Dec. 1, 2016

(65) Prior Publication Data
US 2018/0149220 A1 May 31, 2018

(30) Foreign Application Priority Data
May 28, 2015 (IT) .................. 102015000018889

(51) Int. Cl.
*F16D 55/2265* (2006.01)
*F16D 65/095* (2006.01)
(Continued)

(52) U.S. Cl.
CPC ......... *F16D 65/095* (2013.01); *F16D 55/228* (2013.01); *F16D 2055/002* (2013.01);
(Continued)

(58) Field of Classification Search
CPC .... F16D 65/0087; F16D 65/095; F16D 55/22; F16D 55/228; F16D 55/22655
(Continued)

(56) References Cited

U.S. PATENT DOCUMENTS

2008/0029356 A1* 2/2008 Halasy-Wimmer ..........................
F16D 55/22655
188/73.45
2017/0350460 A1* 12/2017 Meise ............... F16D 55/22655

FOREIGN PATENT DOCUMENTS

DE       1935863 A1    1/1971
DE       60305886 T2   11/2006
(Continued)

OTHER PUBLICATIONS

Machine-Generated English Translation of DE 1935863, obtained via Espacenet Patent Search.
(Continued)

*Primary Examiner* — Christopher P Schwartz
(74) *Attorney, Agent, or Firm* — Marshall & Melhorn, LLC

(57) ABSTRACT

Caliper assembly for a disc brake comprising a caliper body and at least one pin; wherein said pin shank is suitable for being inserted in said at least one pin seat through said second seat opening; and wherein said pin shank comprises a first shank portion, suitable for being received in said at least one pin seat when in operative conditions, and a second shank portion, suitable for projecting canti-levered with respect to said at least one first surface, when in operative conditions; and wherein said first shank portion comprises at least one perimetric protuberance of greater extension along the transversal direction with respect to the adjacent shank portions; and wherein said at least one perimetric protuberance is suitable for forming a friction-fit between said first shank portion and said pin seat; and wherein said pin head comprises at least one under-head portion that extends from said pin head towards said pin shank to form a collar; and wherein said first shank portion comprises at least one groove, arranged between said collar and said perimetric protuberance, said groove forming a recessed shank portion,
(Continued)

of shorter extension along the transversal direction with respect to the transversal extension of said collar and said at least one perimetric protuberance; and wherein said collar is suitable for upsetting, during the step of press-fitting said pin in said pin seat, said mouth portion of said caliper body in said groove, so as to form, through deformation of said mouth portion, a locking tooth suitable for cooperating with said groove to lock said at least one pin in said at least one pin seat.

10 Claims, 6 Drawing Sheets

(51) Int. Cl.
*F16D 55/228* (2006.01)
*F16D 55/00* (2006.01)
(52) U.S. Cl.
CPC .................. *F16D 2055/007* (2013.01); *F16D 2250/0023* (2013.01); *F16D 2250/0038* (2013.01); *F16D 2250/0061* (2013.01); *F16D 2250/0084* (2013.01)

(58) Field of Classification Search
USPC ............................................ 188/73.44, 73.45
See application file for complete search history.

(56) References Cited

FOREIGN PATENT DOCUMENTS

DE 102010003118 A1 10/2010
WO 0123771 A1 4/2001

OTHER PUBLICATIONS

Machine-Generated English Translation of DE 60305886, obtained via Espacenet Patent Search.
Machine-Generated English Translation of DE 102010003118, obtained via Espacenet Patent Search.
Machine-Generated English Translation of WO 0123771, obtained via Espacenet Patent Search.
International Search Report for International Application No. PCT/IB2016/053034 (dated Aug. 16, 2016).

* cited by examiner

CALIPER ASSEMBLY FOR A DISC BRAKE

FIELD OF THE INVENTION

The object of the present invention is a caliper assembly for a disc brake comprising a caliper body and at least one pin, as well as a pin suitable for being press-fitted in a caliper body, as well as a method for press-fitting a pin in a caliper body.

STATE OF THE ART

In a disc brake, the brake caliper is generally arranged astride of the outer peripheral margin of a brake disc, suitable for rotating about a rotation axis defining an axial direction. In a disc brake a radial direction, substantially perpendicular to said axial direction, and a tangential direction, perpendicular both to said axial direction, and to said radial direction are also defined. The brake calipers are constrained to a support structure that remains immobile with respect to the vehicle, like for example a stub axle of a suspension of a vehicle or a hub of a wheel of a vehicle. The brake caliper usually comprises a caliper body comprising two elongated portions arranged so as to face opposite braking surfaces of a brake disc, and at least one bridge that connects said two elongated portions to one another.

In a typical arrangement of a disc brake on a vehicle, a braking surface of the brake disc faces towards the vehicle, defining the vehicle side of the disc brake, and the opposite braking surface of the brake disc faces towards the wheel of the vehicle, defining the wheel side of the disc brake. Therefore, when a brake caliper is mounted on a brake disc, a first elongated portion of the caliper body is in the vehicle side, and a second elongated portion of the caliper body is in the wheel side. Friction pads are foreseen arranged between each elongated portion of the caliper body and the facing braking surfaces of the brake disc. At least one of the elongated portions of the caliper body has cylinders suitable for receiving hydraulic pistons capable of exerting a thrusting action on the friction pads abutting them against the braking surfaces of the disc to exert the braking action on the vehicle.

Pins are generally arranged beside the pads along the tangential direction of the disc brake to provide an abutment, on which the pad rests, to discharge the braking action, both in forward travel conditions and in reverse travel conditions. Pins of this type are stressed by bending. Said pins are also suitable for allowing the sliding of the friction pads towards the respective braking surfaces of the brake disc as the friction material of the brake pads is progressively consumed.

Moreover, according to a type of known brake caliper, as for example described in document EP2318729B1, the brake pads are supported by pins connected to the caliper body of the brake caliper and comprise eyelets in which canti-levered portions of said pins are inserted with clearance, so that the associated pads are free to slide along said canti-levered portions of said pins, when subjected to the action of suitable thrusting means. During the braking action, the pad is placed under traction and/or compression (for example in the case of pads for calipers for racing vehicles) and said pins have the function of transmitting the braking force that develops from the contact between pads and disc at the caliper body and therefore are stressed by bending.

Pins are generally used mounted in a caliper body suitable for guiding the relative movement of portions of the brake caliper. For example, in the technical field of floating calipers, pins are used to guide the sliding of the floating caliper body with respect to a fixed element, like for example a support bracket, as is known for example from document WO2012/156849A1.

As illustrated in FIG. 19, a known solution for a pin comprises, for example, a threaded portion that is engaged by a screw, and externally a diameter adapted to be coupled with a suitable seat formed in the caliper to ensure the coupling between pin and caliper body, in operative conditions. A pin of this type requires operation on both sides of the seat in which it is press-fit, indeed once the pin is inserted in its seat it is necessary to operate on the screw arranged on the opposite side of the side to the pin entry side. Moreover, the provision of a threaded coupling has some drawbacks. Firstly, the process of masking a hole and of threading a pin have a cost that is not always negligible with respect to the production cost of the pin, in particular considering the maintenance requirements of the machinery suitable for the purpose.

Moreover, in operating conditions, the repeated mechanical and thermal stresses deriving from the braking action, as well as the exposure to corrosive agents, or corrosion phenomena, deteriorate the threading of said coupling. Said stresses are increased when the brake caliper is designed for applications in racing vehicles, producing an increase of the undesired effects described above.

Alternative solutions to threaded coupling are generally known, for example rivets comprising a shank having variable section suitable for making a sealed coupling with the opening of a rivet seat formed in a seat body. For example, document DE102008059343A1 shows a rivet that comprises, at a shank end thereof, a portion suitable for hooking onto a surface of the seat body arranged undercut on the opposite side to the rivet entry side. When the rivet is inserted, the application of a force on said portion makes it possible to upset the seat body and to make material of the seat body flow into a groove arranged in the under-head area of the rivet.

However, a solution of this type is not suitable for being applied in brake pincers because it has some drawbacks. Firstly, the force that is generated during the entry step with interference of the rivet in the seat adds to the upsetting stresses and causes overstresses in the caliper body. Moreover, the need to operate on both sides of the seat body makes this solution very onerous in terms of the time necessary to press-fit the rivet. The shank of a rivet of this type is also unsuitable for applications as a pin for a brake caliper since it comprises a portion suitable for being bent, instead of projecting canti-levered from said caliper body.

There is therefore a need to provide a brake caliper assembly comprising at least one pin suitable for projecting canti-levered from said caliper body, as well as a method for press-fitting, coupling with force a pin in a caliper body that is quick and simple, which maintains suitable operating safety guarantees and at the same time that does not causes overstresses to the caliper body, deteriorating the mechanical properties thereof.

Solution

A purpose of the present invention is to avoid the drawbacks of the prior art and to provide a solution to the requirement of providing a caliper assembly for a disc brake, comprising at least one pin suitable for projecting canti-levered from said caliper body, capable of maintaining its mechanical characteristics over time and wherein said pin is press-fit firmly and long-lastingly at said caliper body.

A further particular purpose of the present invention is to provide a brake caliper assembly comprising at least one pin, as well as an improved method for press-fitting said pin in the caliper body, which is faster, simpler, as well as more cost-effective with respect to known solutions, without for this reason providing reduced reliability.

A further particular purpose of the present invention is that of providing a pin capable of firmly coupling in a seat formed in a caliper body, and that is lighter than known solutions.

These and other purposes are accomplished with an assembly according to claim 1 as well as with a method according to claim 8.

Some advantageous embodiments are the object of the dependent claims.

Thanks to the provision of a caliper assembly for a disc brake comprising a caliper body and at least one pin, in accordance with the invention, a brake caliper product is provided that is reliable and suitable for maintaining its mechanical characteristics over time.

Thanks to the provision of a caliper assembly for a disc brake comprising a caliper body and at least one pin, in accordance with the invention, it is ensured that the dimensional tolerances are not changed in operating conditions, as well as ensuring that the axis of the pin is positioned geometrically where foreseen.

Thanks to the provision of a caliper assembly for a disc brake comprising a caliper body and at least one pin, suitable for being press-fitted in a pin seat by operating on a single side of the caliper body, it is possible to press-fit said pin according to a press-fitting method that is quick and simple, as well as reliable.

An assembly comprising a caliper body and at least one pin, in accordance with the present invention is lighter with respect to known solutions, thanks to the fact that said at least one pin does not need to be coupled with the caliper body through a screw or other external fixing element.

A pin in accordance with the present invention is versatile, i.e. it is capable of being used in different applications, for example and not for limiting purposes it can act as an abutment for a brake pad and/or it can act as a sliding guide for a brake pad.

FIGURES

Further characteristics and advantages of the assembly and of the method will become clear from the following description of preferred embodiments thereof, given for indicating and not limiting purposes, with reference to the attached figures, in which.

DESCRIPTION OF SOME PREFERRED EMBODIMENTS

Figure 1:
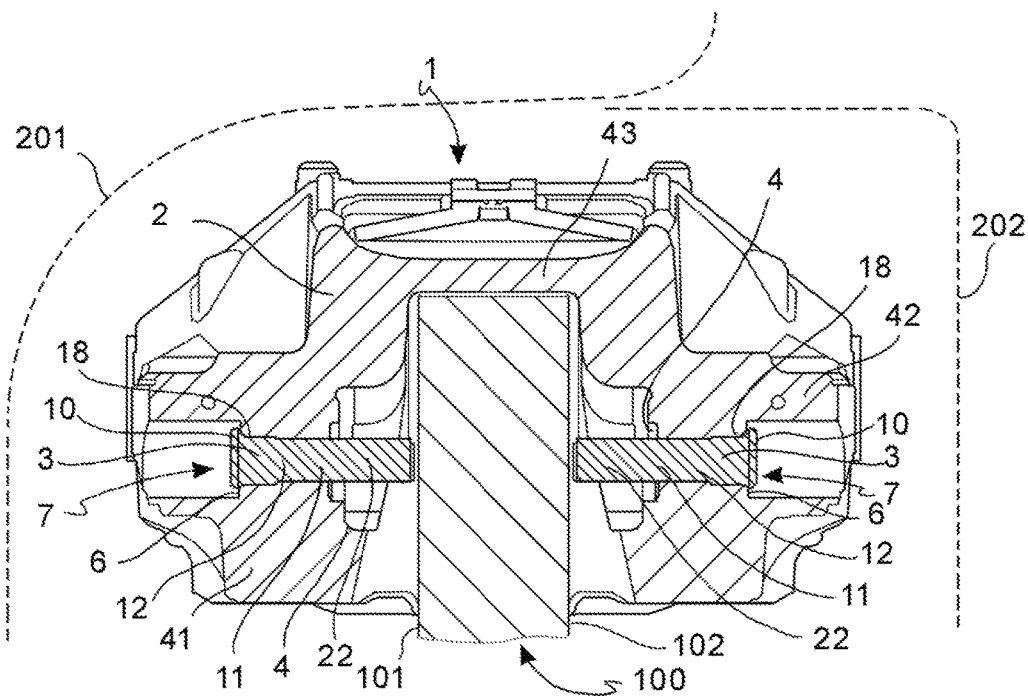
FIG. 1 is a schematised section view of an assembly, in accordance with an embodiment of the invention, and mounted astride of an associable brake disc.

In the following description, the term "friction-fit" (in German: "Reibschluss") between two bodies is meant to indicate a coupling by interference, in which the extent of said interference must be sufficiently high as to prevent any clearance between the two bodies coupled through friction-fit. In other words, friction-fit is the opposite to a coupling with clearance. In the description, reference will be made to the portion of pin coupled by friction-fit also as "interfering portion".

In the following description, the term "form-friction-fit" between two bodies is meant to indicate a friction-fit, as defined above, in which at least one of said two bodies has a surface that is worked for example through knurling and/or creasing and that comprises raised parts, so that they cause elasto-plastic deformation of the surface of the other body, for example increasing the extension of the contact surface between said two bodies as well as the effectiveness of the coupling.

In the following description, the term "perimetric protuberance" is meant to indicate an offshoot, or a set of offshoots or projections, also disconnected from one another, to form an ideal path that extends at least partially along the edge of a generic section of a body and said section is not necessarily a transversal section but can be obtained through a cut in any direction.

In accordance with a general embodiment, a caliper assembly 1 for a disc brake comprises a caliper body 2 and at least one pin 3.

Said caliper body 2 is suitable for being arranged astride of a brake disc 100, said brake disc 100 having a first braking surface 101, or vehicle-side braking surface 101, and a second braking surface 102, or wheel-side braking surface 102, opposite said first braking surface 101.

Said vehicle-side braking surface 101 is suitable for facing the vehicle 201 and said wheel-side braking surface 102 is suitable for facing the wheel of the vehicle 202.

Said caliper body 2 comprises a first elongated portion 41, or vehicle-side elongated portion 41, suitable for facing said first braking surface 101, and a second elongated portion 42, or wheel-side elongated portion 42, opposite said first elongated portion 41 and suitable for facing said second braking surface 102. Said caliper body 2 comprises at least one bridge 43 that connects said first elongated portion 41 with said second elongated portion 42 so as to be arranged astride of the brake disc 100, when said caliper body 2 is assembled to the brake disc 100.

At least one from said first elongated portion 41 and said second elongated portion 42 comprises at least one first surface 4, suitable for facing said first braking surface 101 or said second braking surface 102, respectively.

In accordance with an embodiment, each of said first elongated portion 41 and second elongated portion 42 comprises said at least one first surface 4, suitable for facing said first braking surface 101 and said second braking surface 102, respectively.

At least one from said first elongated portion 41 and said second elongated portion 42 comprises at least one second surface 6, opposite with respect to said first surface 4 and suitable for facing the vehicle or the wheel of the vehicle, respectively.

In accordance with an embodiment, each of said first elongated portion 41 and second elongated portion 42 comprises said at least one second surface 6, opposite with respect to said first surface 4 and suitable for facing the vehicle and the wheel of the vehicle, respectively.

Said caliper body 2 comprises at least one pin seat 7 that opens into said first surface 4 through a first seat opening 8 made in said first surface 4 and that opens into said second surface 6 through a second seat opening 9 made in said second surface 6, said pin seat 7 being suitable for placing said at least one first surface 4 in communication with said at least one second surface 6.

In accordance with an embodiment, said pin seat 7 is a through hole, suitable for placing said first surface 4 in communication with said second surface 6.

In accordance with an embodiment, said second surface 6 is arranged in a recess 5 of the caliper body 2.

Said caliper body 2 comprises a mouth portion 18 that delimits said second seat opening 9.

Said at least one pin 3 comprises a pin head 10 and a pin shank 11, said pin defining a longitudinal direction X-X, coinciding with the direction of longitudinal extension of said pin shank 11, and a transversal direction Y-Y, perpendicular to the longitudinal direction X-X. In the description, reference will be made to the extension along the longitudinal direction X-X also with the term "longitudinal extension"; in analogous manner, reference will be made to the extension along the transversal direction Y-Y also with the term "transversal extension".

Said pin shank 11 is suitable for being inserted in said at least one pin seat 7 through said second seat opening 9.

Said pin 3 is press-fitted by operating on a single side of said pin seat 7 of said caliper body 2, and particularly from the side of said pin seat 7 that opens into said second surface 6 through said second seat opening 9, and therefore it does not require operation on the side of said pin seat 7 of said caliper body 2 that opens into said first surface 4 through said first seat opening 8. In other words, said pin 3 is press-fitted by operating exclusively on the outer side of said first and/or said second elongated portion 41, 42 of the caliper body 2, i.e. facing the vehicle or the wheel of the vehicle, and it does not require operation also on the inner side of said first and/or said second elongated portion 41, 42 of the caliper body 2, facing said first and/or second braking surface 101, 102 of the brake disc 100.

In accordance with an embodiment, said pin shank 11 is suitable for being inserted exclusively through said second seat opening 9.

Said pin shank 11 comprises a first shank portion 12, suitable for being received in said at least one pin seat 7 when in operative conditions, and a second shank portion 22, suitable for projecting canti-levered with respect to said at least one first surface 4 facing said brake disc 100, when in operative conditions.

Said first shank portion 12 comprises at least one perimetric protuberance 14, of greater extension along the transversal direction Y-Y with respect to the adjacent shank portions.

Said at least one perimetric protuberance 14 is suitable for forming a friction-fit between said first shank portion 12 and said pin seat 7.

The term "adjacent shank portions" is meant to indicate the portions of said pin shank 11 that are located close, in the specific case described above portions of said pin shank 11 that are close to said at least one perimetric protuberance 14.

Said pin head 10 comprises at least one under-head portion 13 that extends from said pin head 10 towards said pin shank 11, in the longitudinal direction X-X, to form a collar 16.

In accordance with an embodiment, said collar has a shorter transversal extension than said pin head 10 and in said under-head portion 13, between said collar 16 and said pin head 10, there is an under-head step 36. In accordance with an embodiment, said collar 16 is joined to said pin head 10 through an under-head slit 35.

Said first shank portion 12 comprises at least one groove 17, arranged between said collar 16 and said perimetric protuberance 14, said groove 17 forming a recessed shank portion 19, of shorter extension along the transversal direction Y-Y with respect to the extension along the transversal direction Y-Y of said collar 16 and with respect to the extension along the transversal direction Y-Y of said at least one perimetric protuberance 14.

Said collar 16 is suitable for upsetting, during the step of press-fitting said pin 3 in said pin seat 7, said mouth portion 18 of said caliper body 2 in said groove 17, so as to form, through deformation of said mouth portion 18, an locking tooth 20 suitable for cooperating with said groove 17 to lock said at least one pin 3 in said at least one pin seat 7.

Advantageously, thanks to the provision of said collar 16 during the press-fitting step of said pin 3, in said mouth portion 18 of said caliper body 2, a deformation process is actuated that generates a flow of material that goes to form said locking tooth 20, which when in operating conditions prevents said pin 3 coming out from said pin seat 7. The provision of said groove 17 arranged between said collar 16 and said at least one protuberance 14 forces the deformed material of said mouth portion 18 to flow at least partially in said groove 17.

Advantageously, the provision of said locking tooth 20 as well as of said at least one peripheral protuberance 14, provides the certainty that the dimensional tolerances as well as the geometric tolerances, set at the design stage, are respected.

Advantageously, in order to press-fit said pin 3 in said pin seat 7 formed in said caliper body 2, only one side of the caliper body 2 is operated on. In other words, said pin 3 can be press-fitted in said pin seat 7 of the caliper body 2 by exerting the press-fitting action exclusively on said pin head 10, which is accessible from said second surface 6.

In accordance with an embodiment, said locking tooth 20 is positioned undercut with respect to said at least one protuberance 14 in the longitudinal direction X-X. The provision of said locking tooth 20 positioned undercut with respect to said at least one protuberance 14, prevents the relative movement along the longitudinal direction X-X between pin 3 and caliper body 2.

In accordance with an embodiment, said deformation of said mouth portion 18 of said pin seat is an elasto-plastic deformation.

In accordance with an embodiment, said at least one perimetric protuberance 14 is made adjacent to said groove 17, in said first shank portion 12. In other words, said at least one perimetric protuberance 14 is made in an adjacent portion of pin shank 11 with respect to said groove 17.

In accordance with an embodiment, the volume occupied by said collar 16 substantially corresponds to the volume of said groove 17 so that the material deformed by upsetting by said collar 16 and locked by said at least one protuberance 14 flows in said groove 17, to form said locking tooth 20. In other words, the volume of material of caliper body 2 that flows as a result of the upsetting through the action of said collar 16 substantially corresponds to the volume that said groove 17 is suitable for receiving. The material upset by the action of said collar 16 necessarily enters into said groove 17, with the flow of material being substantially blocked by the presence of said at least one perimetric protuberance 14, arranged close to said groove 17. Said at least one first protuberance 14 is suitable both of producing a friction-fit with said pin seat 7, and of influencing the flow of material upset by said collar 16 so that it enters into said groove 17.

In accordance with an embodiment, said at least one perimetric protuberance 14 is knurled or worked through knurling, and is suitable for forming a form-friction-fit through a deformation of at least one portion of said pin seat 7.

In accordance with an embodiment, said at least one perimetric protuberance 14 is worked through ribbing, and is suitable for forming a form-friction-fit through a deformation of at least one portion of said pin seat 7.

The provision of at least one knurled perimetric protuberance 14, during the step of press-fitting, reciprocally deforms the portion of the pin seat 7 with which it couples by form-friction-fit so as to counteract the relative movement between said pin 3 and said pin seat 7, when in operating conditions.

The provision of at least one perimetric protuberance 14 consisting of a series of knurlings with straight teeth makes it possible to reduce the stress of the press-fitting action and increase the precision thereof, as well as constituting an anti-rotation and/or anti-translation element along the transversal direction Y-Y. Indeed, during the step of press-fitting, the valleys present in the knurling constitute actual seats where the upsetting of the material of the pin seat 7 moved by the knurling teeth meets up, forming an actual geometric coupling of the guide-pad type.

In accordance with an embodiment, said at least one perimetric protuberance 14 is at least one portion of a rounded surface of said first shank portion 12, suitable for forming a friction-fit with a portion of said pin seat 7.

A rounded surface has a curved profile along the longitudinal direction X-X and that varies substantially continuously, to form said at least one protuberance 14, in at least one portion of maximum transversal extension thereof.

In accordance with an embodiment, said first shank portion 12 comprises a further perimetric protuberance 14, so as to comprise at least two perimetric protuberances 14a, 14b.

In accordance with an embodiment, said at least two perimetric protuberances 14a, 14b are disconnected from one another.

Said at least two perimetric protuberances 14a, 14b are suitable for forming at least two portions suitable for forming a friction-fit with said pin seat 7.

In accordance with an embodiment, at least one perimetric protuberance 14 of said at least two perimetric protuberances 14a, 14b is knurled or worked through knurling, and is suitable for forming a form-friction-fit through a deformation of at least one portion of said pin seat 7.

In accordance with an embodiment, at least one perimetric protuberance 14 of said at least two perimetric protuberances 14a, 14b is worked through ribbing, and is suitable for forming a form-friction-fit through a deformation of at least one portion of said pin seat 7.

In accordance with an embodiment, at least one perimetric protuberance 14 of said at least two perimetric protuberances 14a, 14b is at least one portion of a rounded surface of said first shank portion 12, suitable for forming a friction-fit with a portion of said pin seat 7.

In accordance with an embodiment, a first perimetric protuberance 14b is arranged in an adjacent shank portion with respect to said groove 17 on the opposite side of said collar 16 substantially close to said second opening 9 and a second perimetric protuberance 14a is arranged close to said first opening 8 of said pin seat 7.

The provision of two perimetric protuberances 14a, 14b substantially close to the openings 8, 9 of said pin seat 7, makes it possible to obtain the maximum static stability of the pin 3, and at the same time allows better precision of press-fitting and greater precision of geometric arrangement of the pin 3 in said pin seat 7.

In accordance with an embodiment, exclusively said at least one perimetric protuberance 14 is suitable for forming a friction-fit between said first shank portion 12 and said pin seat 7. In other words, the surfaces of said first shank portion 12 outside of said at least one protuberance 14 are unsuitable for forming a friction-fit with said pin seat 7.

In accordance with an embodiment, said at least one perimetric protuberance 14 extends for a section along the longitudinal direction X-X that is shorter than the extension along the longitudinal direction X-X of said first shank portion 12. In accordance with an embodiment, said at least one perimetric protuberance 14 has a shorter longitudinal extension than at least one adjacent shank portion.

The provision of at least one perimetric protuberance 14 on one or more parts of said first shank portion 12 makes it possible to friction-fit one or more parts of said first shank portion 12 with reciprocal portions of said pin seat 7. Therefore, the provision of areas in which said first shank portion 12 is free from contact with said pin seat 7, requires a smaller press-fitting force of said at least one pin 3 with respect to the press-fitting force necessary to press-fit the same pin 3 able to be coupled by friction-fit along the entire said first shank portion 12.

In other words, the provision of an interference portion of said first shank portion 12 of reduced extension along the longitudinal direction with respect to the longitudinal extension of said seat makes it possible to reduce the press-fitting force of the pin, while still conserving adequate operative stability and precision of press-fitting. From an analysis carried out by the inventors, it emerges that this embodiment reduces the risk of deformation of the pin seat 7, and the geometric arrangement of the pin 3 is more accurate with respect to a pin having a portion interfering on the entire said first shank portion 12.

In accordance with an embodiment said second perimetric protuberance 14b has a shorter extension in the longitudinal direction X-X than both of the adjacent shank portions.

In accordance with an embodiment, said collar 17 has a greater extension in the transversal direction Y-Y than the extension in the transversal direction Y-Y of said at least one perimetric protuberance 14, 14a, 14b. The provision of a collar 16 with greater transversal extension than the transversal extension of said at least one perimetric protuberance makes it possible to plasticize the material of said mouth portion 18 so as to form said locking tooth 20.

In accordance with an embodiment, said collar 16 is suitable for always being press-fitted in the metal of said mouth portion 18 of said caliper body 2, when in operating conditions.

In accordance with an embodiment, said second perimetric protuberance 14b has a shorter extension in the transversal direction Y-Y than the extension in the transversal direction Y-Y of said first perimetric protuberance 14a.

The provision of a second perimetric protuberance 14b, the first of the protuberances to enter into the pin seat 7, with shorter transversal extension than the transversal extension of said first perimetric protuberance 14a, which enters into the pin seat 7 after said second perimetric protuberance 14b, allows both of said protuberances to make a friction-fit with said pin seat 7.

In accordance with an embodiment, said second perimetric protuberance 14b is knurled, and when said first shank portion 12 is press-fitted in said seat 7, said second perimetric protuberance 14b draws said pin seat 7 making a drawing profile in said seat 7, then said first perimetric protuberance 14a of greater transversal extension with respect to said second perimetric protuberance 14b enters into said pin seat 7 and draws it again, exerting a greater interfering force on said pin seat 7 with respect to the interfering force exerted by said second protuberance 14b, then said collar 16 enters that upsets the material of said mouth portion 18 making said locking tooth 20. Therefore a second seat step 34b is formed in said pin seat 7 by means of the interference of said second protuberance 14b with the surface of said seat wall 7 and a first seat step 34a is formed in said pin seat 7 by means of the interference of the first protuberance 14a with the surface of said seat wall 7 already drawn by said second protuberance 14b.

In accordance with an embodiment, said at least one perimetric protuberance 14 produces said at least one seat step 34.

In accordance with an embodiment, said at least one perimetric protuberance 14 is a single protuberance that extends along the entire said first shank portion 12. In accordance with an embodiment, said single protuberance is entirely knurled.

The provision of a single perimetric protuberance that extends along the entire said first shank portion 12 makes it possible to maximise the force necessary to decouple said pin 3 from said pin seat 7, as well as to maximise the anti-rotation effect of the pin shank 11 in the pin seat 7.

In accordance with an embodiment, at least one portion of said pin shank 11 is substantially cylinder-shaped with a substantially circular base. In accordance with an embodiment, said under-head portion 13 is substantially discoid-shaped, to form said collar 16. In accordance with an embodiment, said collar 16 is an annular collar. In accordance with an embodiment, said groove 17 is an annular groove. In accordance with an embodiment, said pin seat 7 comprises at least one substantially cylindrical wall. In accordance with an embodiment, said first seat opening 8 has a substantially circular shape. In accordance with an embodiment, said second seat opening 9 has a substantially circular shape.

The provision of a pin shank 3 with cylindrical geometry makes it possible to optimise the distribution of material as a function of the bending resistance value that is wished to be given to said pin shank, at the design stage.

In accordance with an embodiment, said at least one perimeter protuberance 14 has a substantially annular shape. In accordance with an embodiment, said rounded surface is a substantially toroidal surface.

In accordance with an embodiment, said pin head 10 has at least one raised portion 31, made through incision of the adjacent portions of the pin head 10, clinching of the pin head 10, or moulding. In accordance with an embodiment, said at least one raised portion 31 has an ornamental function and/or one of recognition of the pin product 3. In accordance with an embodiment, said at least one raised portion 31 is suitable for improving the grip of a tool on said pin head 3.

In accordance with an embodiment, said under-head portion 13 comprises a toothing, suitable for causing said deformation of said mouth portion 18.

In accordance with an embodiment, said pin shank 11 comprises a blind hole, or shank cavity 21, which extends along the longitudinal direction X-X on at least one portion of said pin shank 11, said shank cavity 21 being accessible through a cavity opening 32 and at least partially delimited by at least one cavity surface 30.

The provision of a shank cavity 21 makes it possible to reduce the weight of said pin 3 as well as of said caliper assembly 1.

In accordance with an embodiment, said pin seat 7 comprises at least one substantially smooth wall.

In accordance with an embodiment, at least said mouth portion 18 of said caliper body 2 is made of a tougher and/or more ductile material with respect to said pin shank 11 and to said collar 16. In accordance with an embodiment, said pin shank 11 and said collar 16 are made of a harder material with respect to said mouth portion 18 of said caliper body 2. In accordance with an embodiment, said caliper body 2 is made at least partially from aluminium or aluminium alloy or cast iron. In accordance with an embodiment, said pin 3 is made at least partially from steel, quenched steel or titanium.

In accordance with an embodiment, at least one from said first elongated portion 41 and said second elongated portion 42 of said caliper body 2 is suitable for receiving at least one brake pad 15, and wherein said at least one pin 3 is suitable for being used as resting pin, suitable for forming an abutment for at least one abutment surface 23 of said at least one brake pad 15. As known, during the braking action, the brake pads 15 abut against the braking surfaces 101, 102 of the brake disc 100, and through the tangential friction tend to follow the rotary movement of the disc 100, i.e. towards the exit direction of the disc 100 from the caliper body 2. Therefore, the use of pins 3 alongside said pads 15 makes it possible to keep the pads 15 in useful position, both in forward travel condition and in reverse travel condition. Said pins 2 can also be suitable for promoting the sliding of at least one abutment surface 23 of said brake pad 15, when, in conditions of prolonged use, the friction material of said brake pads 15 is consumed by friction, forcing at least one portion of pad to approach the respective braking surface of the disc 101, 102, to exert the braking action.

Figures 5, 6:
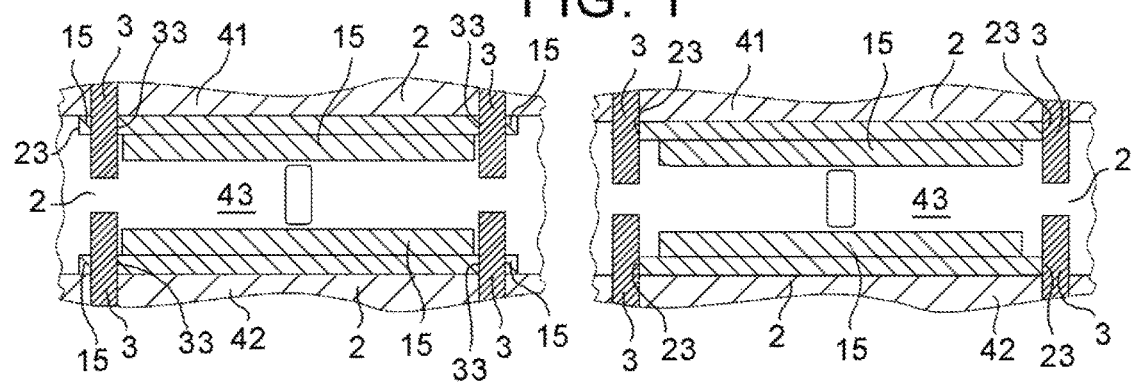
FIGS. 5 and 6 are schematised section views in the tangential direction of a portion of an assembly according to the invention, in accordance with two embodiments, highlighting a portion of the caliper body and of the pads housed in it that receive or support the pins.
Figure 7:
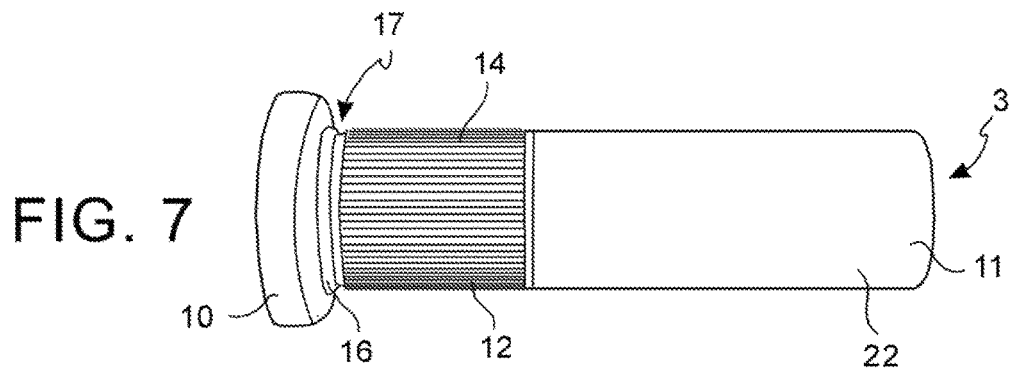
FIG. 7 is a view of a pin, in accordance with a further embodiment of the invention.
Figure 2:
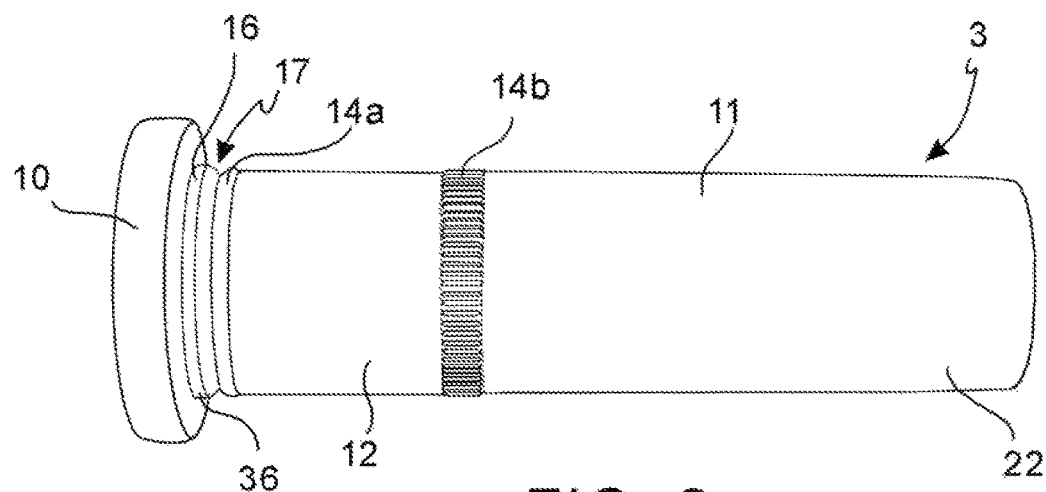
FIG. 2 is a view of a pin, in accordance with an embodiment of the invention.
Figure 3:
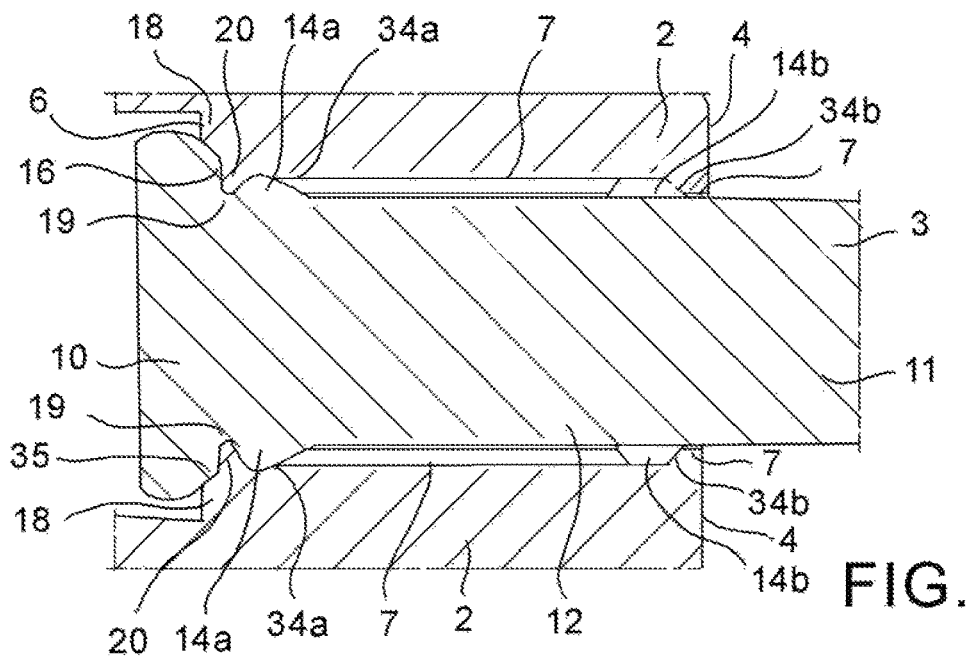
FIGS. 3 and 4 are section views that show details of an assembly, in accordance with an embodiment of the invention.
Figure 4:
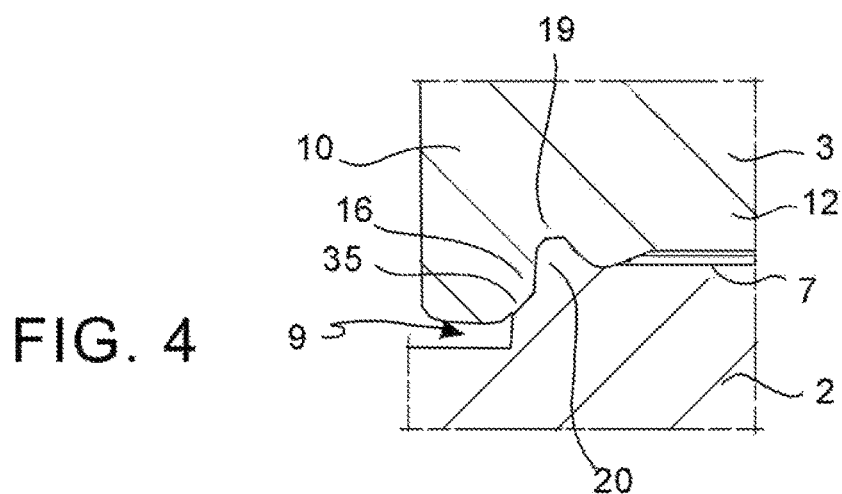

In accordance with an embodiment, as for example illustrated in FIG. 5, each of said first elongated portion 41 and said second elongated portion 42 of said caliper body 2 is suitable for receiving at least one brake pad 15, so that said assembly 1 comprises at least two brake pads 15 and at least four pins 2, press-fitted so that said second shank portion 22 of each of said at least four pins 3 projects canti-levered substantially close to abutment surfaces 23 of said at least two brake pads 15, so that, when in operative conditions, said at least four pins 3 are suitable for forming an abutment, for said at least two brake pads 15.

The provision of at least one pin 3 suitable for forming an abutment, or a support, for at least one portion of a pad through said second shank portion 22, increases the amount of stresses due to bending on said pin 3, when it is in operating conditions. The provision of at least one pin 3 suitable for forming an abutment for a brake pad 15 makes it possible to make a caliper body 2 for example without seat pockets to receive the pads 15, since the pads are kept in position by the action of said at least one pin 3.

In accordance with an embodiment, said at least one pin 3 is suitable for being used as pad sliding pin. In other words, said second shank portion 22 of said pin is suitable for being inserted with clearance in an eyelet 33, or a slot 33, made on a brake pad 15 so as to form a sliding guide for the pad 15, when it abuts against one of said braking surfaces 101, 102 of the brake disc 100.

In accordance with an embodiment, as for example illustrated in FIG. 6, each of said first elongated portion 41 and said second elongated portion 42 of said caliper body 2 is suitable for receiving at least one brake pad 15, so that said assembly 1 comprises at least two brake pads 15 and at least four pins 2, press-fitted so that said second shank portion 22 of each of said at least four pins 3 is inserted in a pad eyelet 33 of said at least two brake pads 15, so that, when in operative conditions, said at least four pins 3 are suitable for forming a sliding guide, for said at least two brake pads 15.

Said at least one pin 3 is versatile and can be used in different applications.

In accordance with an embodiment, said pin 3 is suitable for working by bending, when it is in operating conditions. In accordance with an embodiment, said pin 3 is suitable for working mainly by bending, when it is in operating conditions.

In accordance with an embodiment, said assembly 1 comprises said caliper body 2 and a plurality of said pins 3, said plurality of said pins 3 being suitable for being inserted in a plurality of pin seats 7, by a plurality of said second seat openings 9.

The invention also concerns a pin 3 without caliper to be imagined as a spare part or as a supply piece for first mounting, said pin comprising a pin head 10 and a pin shank 11. In accordance with an embodiment, said pin defines a longitudinal direction X-X, coinciding with the direction of longitudinal extension of said pin shank 11, and a transversal direction Y-Y, perpendicular to the longitudinal direction X-X. In accordance with an embodiment, said pin shank 11 is suitable for being inserted in said at least one pin seat 7 through said second seat opening 9. In accordance with an embodiment, said pin shank 11 comprises a first shank portion 12, suitable for being received in said at least one pin seat 7 when in operative conditions, and a second shank portion 22, suitable for projecting canti-levered with respect to said at least one first surface 6, when in operative conditions. In accordance with an embodiment, said first shank portion 12 comprises at least one perimetric protuberance 14, of greater extension along the transversal direction Y-Y with respect to the adjacent shank portions. In accordance with an embodiment, said at least one perimetric protuberance 14 is suitable for forming a friction-fit between said first shank portion 12 and said pin seat 7. In accordance with an embodiment, said pin head 10 comprises at least one under-head portion 13 that extends from said pin head 10 towards said pin shank 11 to form a collar 16. In accordance with an embodiment, said first shank portion 12 comprises at least one groove 17, arranged between said collar 16 and said perimetric protuberance 14, said groove 17 forming a recessed shank portion 19, of shorter extension along the transversal direction Y-Y with respect to the extension along the transversal direction Y-Y of said collar 16 and to the extension along the transversal direction Y-Y of said at least one perimetric protuberance 14. In accordance with an embodiment, said collar 16 is suitable for upsetting, during the step of press-fitting said pin 3 in said pin seat 7, said mouth portion 18 of said caliper body 2 in said groove 17, so as to form, through deformation of said mouth portion 18, a locking tooth 20 suitable for cooperating with said groove 17 to lock said at least one pin 3 in said at least one pin seat 7.

Hereinafter a method for press-fitting a pin 3 in a caliper body 2 will be described.

A method for press-fitting a pin 3 in a caliper body 2, comprises the following steps:
  providing a caliper assembly 1 according to any one of the embodiments described above;
  inserting said pin shank 11 in said pin seat 7 from said second seat opening 8;
  exerting a press-fitting action F on said pin head 10, so as to deform said mouth portion 18, so that it forms a locking tooth 20.

The term "press-fitting action" is meant to indicate the application of a press-fitting force on said pin head 10, for example a continuous pressure and/or a series of impulses of force, sufficient to press-fit said pin 3 in said pin seat 7 foreseen in said caliper body 2, so as to provide friction-fit between said at least one first protuberance 14 and said pin seat 7, as well as so as to provide for the formation of said locking tooth 20 by deformation of said mouth portion 18.

Advantageously, the press-fitting method described above of a pin 3 in a caliper body 2 foresees to operate exclusively on one side of the caliper body 2.

In accordance with a possible way of operating, a press-fitting method comprises the step of providing press-fitting equipment, which allows said two elongated bodies 41, 42 to be connected, said press-fitting equipment comprising:
  at least one press-fitting tool 25, suitable for transmitting the press-fitting action F to said pin head 10;
  at least one support element 26 suitable for being arranged between at least one portion of said at least one first surface 4 of said first elongated portion 41 and at least one portion of said at least one first surface 4 of said second elongated portion 42, so as to limit, during the step of press-fitting, the deformation of said caliper body 2;
  at least one support plane 27, suitable for allowing at least one portion of at least one second surface 6 of at least one from said first elongated portion 41 and said second elongated portion 42 of said caliper body 2 to be rested, during the step of press-fitting.

Said support element 26 has a shape that comprises a housing surface 29, suitable for at least partially receiving said second shank portion 22 of said pin 3, when said pin 3 is press-fitted in said caliper body 2 and/or during the step of press-fitting said pin 3 in said caliper body 2. In accordance with a possible way of operating, said housing surface 29 has a substantially cylindrical shape or at least one portion has a cylindrical shape.

In accordance with a possible way of operating, said support element 26 is made of a material suitable for resisting, for example suitable for neither twisting nor fracturing, when the press-fitting action F is exerted on said pin head 10.

In accordance with a possible way of operating, said support element 26 comprises at least one support surface 28, suitable for facing at least one portion of said first surface 4 of at least one from said first elongated portion 41 and said second elongated portion 42 of said caliper body 2.

Figure 8:
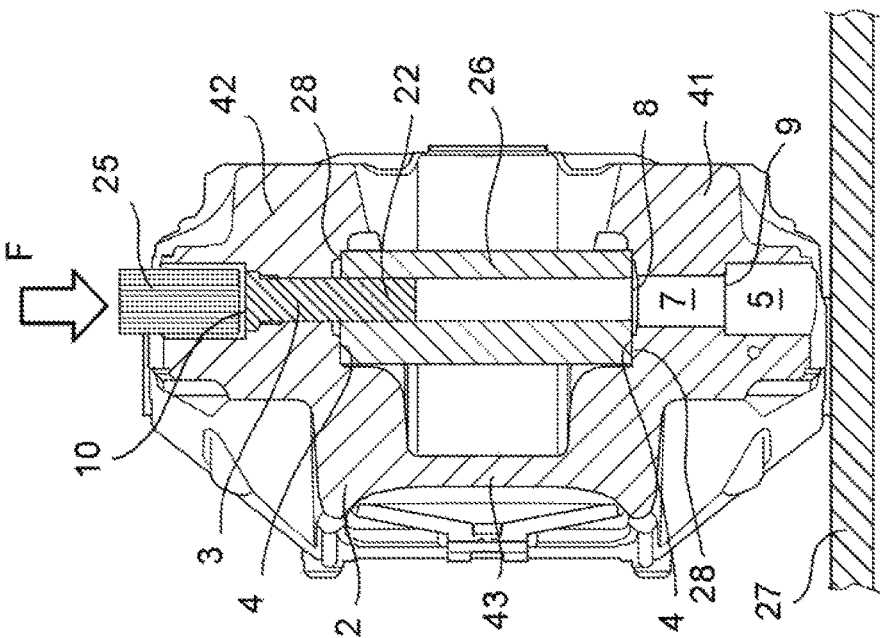
FIGS. 8 and 9 illustrate some steps of a method for press-fitting pins in a caliper body, in accordance with a possible way of operating.
Figure 9:
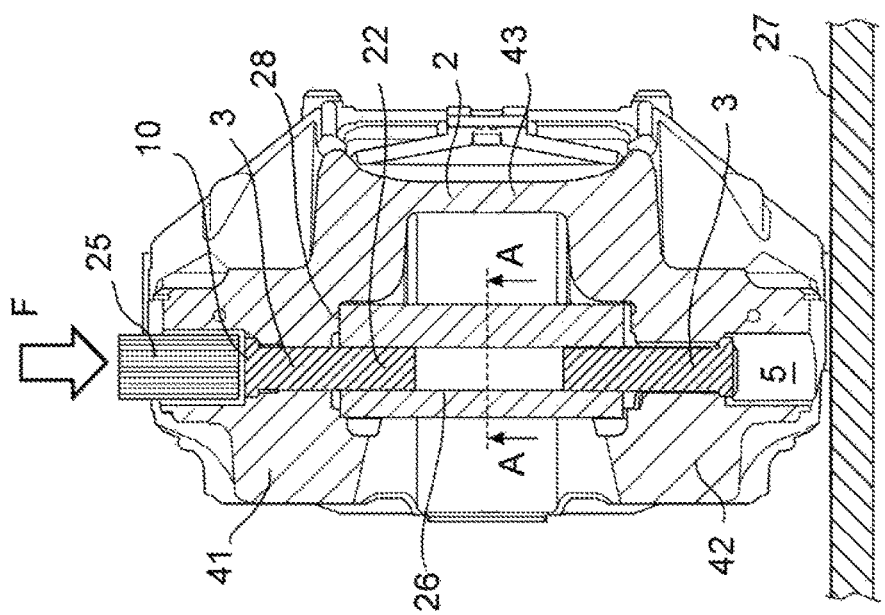
Figure 10:
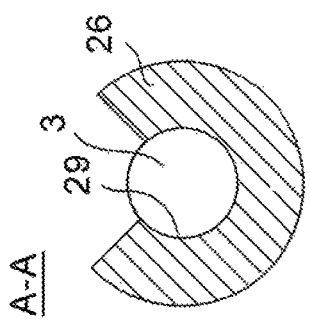
FIG. 10 is a schematised section view along the line A-A of FIG. 9.
Figure 11:
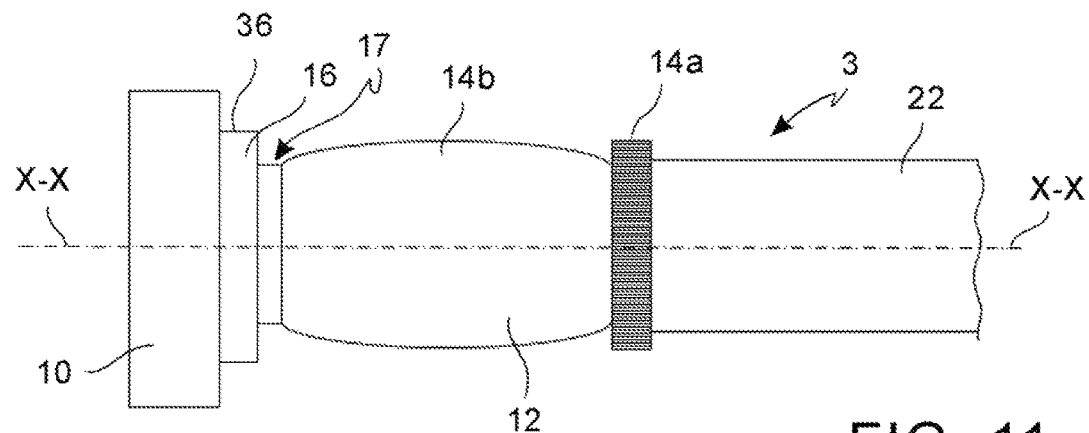
FIG. 11 shows an embodiment of a pin, in accordance with yet another embodiment of the invention.
Figure 12:
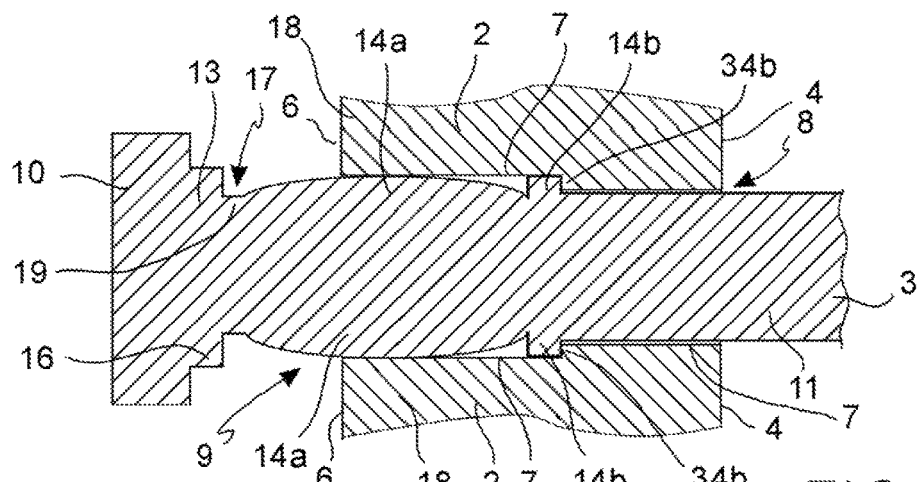
FIGS. 12 and 13 are schematised section views illustrating two steps of insertion of the pin of FIG. 11 in a caliper body, in accordance with a possible way of operating.
Figure 13:
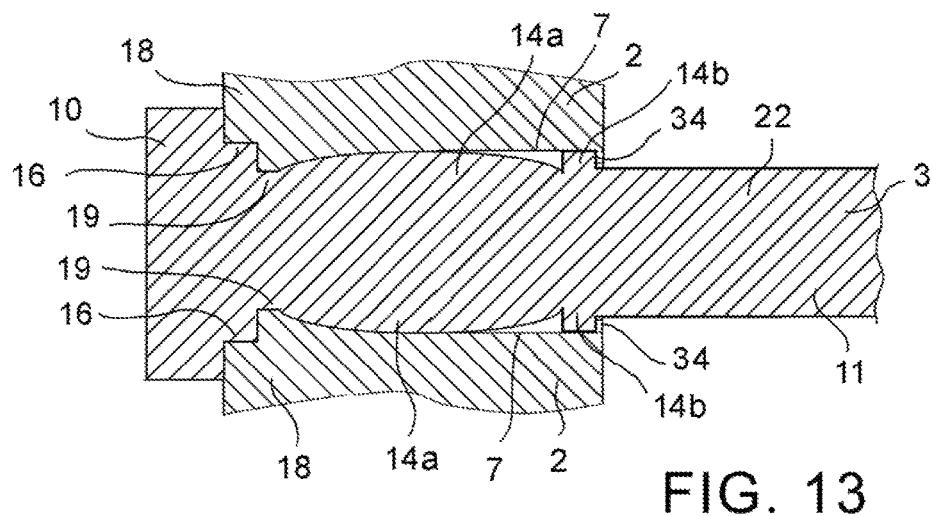
Figure 14:
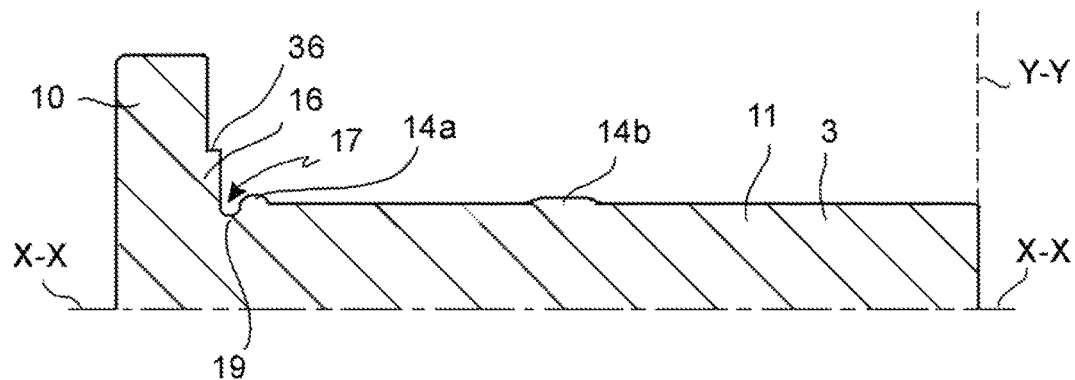
FIG. 14 shows a schematised section view of a portion of a pin, in accordance with an embodiment.
Figure 15:
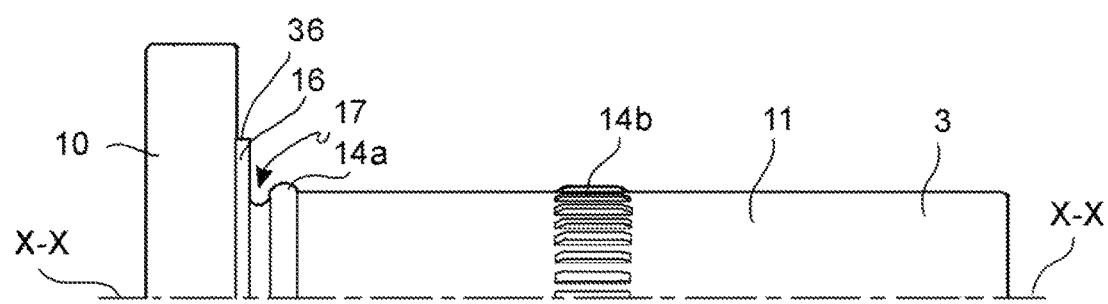
FIG. 15 shows a side view of a portion of a pin, in accordance with an embodiment.
Figure 16:
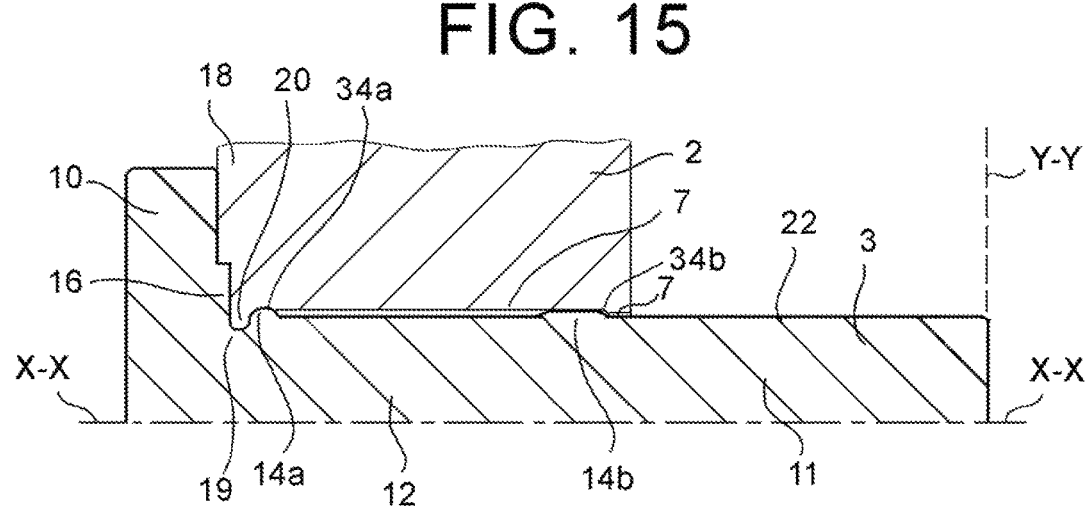
FIG. 16 shows a section view of a portion of an assembly in accordance with an embodiment.
Figure 17:
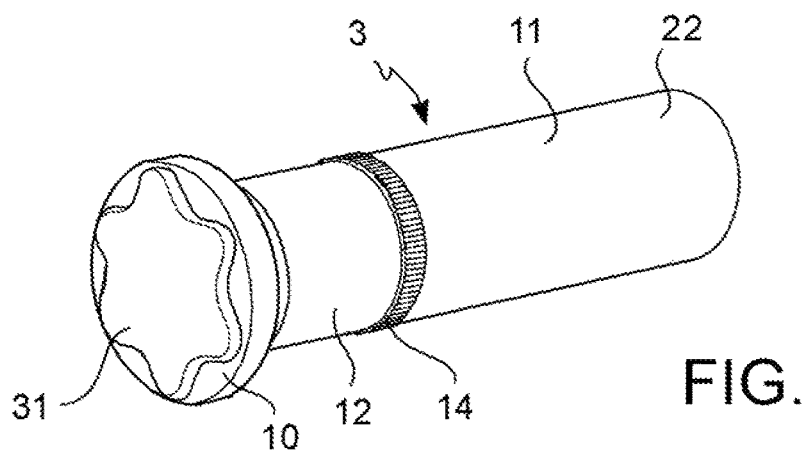
FIG. 17 shows an embodiment of a pin, in accordance with an embodiment.
Figure 18:
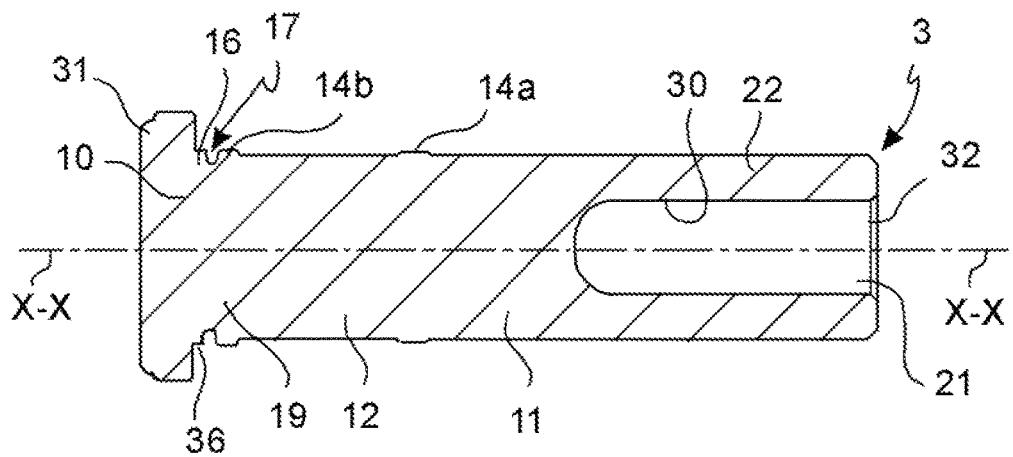
FIG. 18 shows a schematised section of a pin, in accordance with an embodiment.
Figure 19:
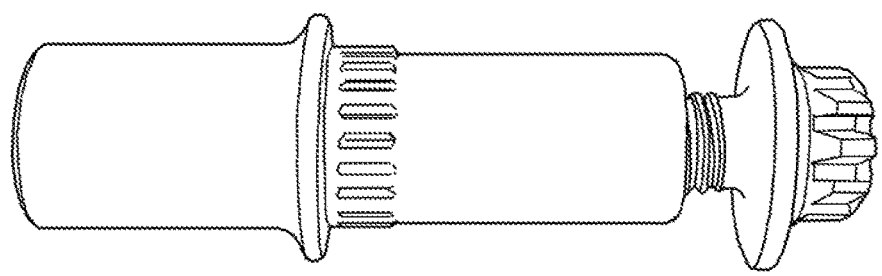
FIG. 19 shows a type of pin of the prior art.

As illustrated in FIGS. 8 and 9, when said caliper body 2 is in press-fitting configuration, at least one from said first elongated portion 41 and said second elongated portion 42 projects at least partially canti-levered with respect to said bridge 43. Said support element 26 has a shape that comprises a housing surface 29, suitable for at least partially receiving said second shank portion 22 of said pin 3, when said pin 3 is press-fitted in said caliper body 2 and/or during the step of press-fitting said pin 3 in said caliper body 2, so as to minimise the torque able to be generated by the press-fitting action F on said pin head 10, avoiding the collapse of the caliper body 2 under the effect of the press-fitting action F of the pin 3. In other words, said support element 26 is suitable for transferring through it the press-fitting action to minimise the bending stresses acting on at least one from said first elongated portion 41 and said second elongated portion 42 arranged canti-levered with respect to said bridge 43, when said caliper body 2 is in press-fitting configuration. From an analysis carried out by the inventors, it emerges that operating the press-fitting action F by using said support element 26, reduces, with respect to a control piece, the tension state on at least one from said first elongated portion 41 and said second elongated portion 42 arranged canti-levered with respect to said bridge 43, when said caliper body 2 is in press-fitting configuration, eliminating the risk of twisting of at least one portion of the caliper body 2, due to the press-fitting action F.

In accordance with a possible way of operating, said housing surface 29 has a substantially cylindrical shape.

In accordance with a possible way of operating, a press-fitting method comprises at least one of the following further steps:
- inserting said support element 26 between said first elongated portion 41 and said second elongated portion 42 of said caliper body 2;
- inserting said support element 26 between at least one portion of said at least one first surface 4 of said first elongated portion 41 and at least one portion of said at least one first surface 4 of said second elongated portion 42;
- providing said pin seat 7 in said first elongated portion 41 of said caliper body 2;
- resting said second elongated portion 42 on said support plane 27, so as to carry out the press-fitting action F on said first elongated portion 41;
- inserting said pin shank 11 in said pin seat 7 provided in said first elongated portion 41 of said caliper body 2;
- exerting the press-fitting action on said pin head 10 through said press-fitting tool 25;
- making said first and said second seat step 34a, 34b, in said pin seat 7;
- minimising the torque generated by said press-fitting action F on said caliper body 2;
- providing said pin seat 7 in said second elongated portion 42 of said caliper body 2;
- inverting said caliper body 2, i.e. rotating said caliper body by 180° so as to rest an opposite elongated portion 41, 42 on said support plane 27;
- resting said first elongated portion 41 on said support plane 27, so as to carry out the press-fitting action F on said second elongated portion 42;
- inserting said pin shank 11 in said pin seat 7 provided in said second elongated portion 41 of said caliper body 2.

Those skilled in the art can bring numerous modifications, adaptations and replacements of elements with other functionally equivalent ones to the embodiments described above, in order to satisfy contingent and specific requirements, without however departing from the scope of the following claims.

REFERENCE LIST

1) Caliper assembly
2) Caliper body
3) Pin
4) First caliper body surface
5) Caliper body recess
6) Second caliper body surface
7) Pin seat
8) First pin seat opening
9) Second pin seat opening
10) Pin head
11) Pin shank
12) First shank portion
13) Under-head portion
14) Perimeter protuberance
14a) First perimeter protuberance
14b) Second perimeter protuberance
15) Brake pad
16) Collar
17) Groove
18) Mouth portion of caliper body
19) Recessed shank portion
20) Locking tooth
21) Shank cavity
22) Second shank portion
23) Brake pad abutment surface
25) Press-fitting tool
26) Support element
27) Support plane
28) Support surface
29) Housing surface
30) Shank cavity surface
31) Raised shank head portion
32) Shank cavity opening
33) Brake pad eyelet
34) Seat step
34a) First seat step
34b) Second seat step
35) Collar slit
36) Collar step
41) First elongated portion of caliper body
42) Second elongated portion of caliper body
43) Bridge
100) Brake disc
101) Vehicle-side braking surface
102) Wheel-side braking surface
X-X) Longitudinal direction of pin
Y-Y) Transversal direction of pin
F) Press-fitting action

The invention claimed is:
1. A caliper assembly for a disc brake comprising a caliper body and at least one pin;
wherein said caliper body is suitable for being arranged astride of a brake disc, said brake disc having a first braking surface, or vehicle-side braking surface, and a second braking surface, or wheel-side braking surface, opposite said first braking surface;

and wherein said caliper body comprises a first elongated portion, or vehicle-side elongated portion, suitable for facing said first braking surface, and a second elongated portion, or wheel-side elongated portion, opposite said first elongated portion and suitable for facing said second braking surface;

said caliper body comprising at least one bridge that connects said first elongated portion with said second elongated portion so as to be arranged astride of the brake disc, when said caliper body is assembled to the brake disc;

and wherein at least one from said first elongated portion and said second elongated portion comprises at least one first surface, suitable for facing said first braking surface or said second braking surface;

and wherein at least one from said first elongated portion and said second elongated portion comprises at least one second surface, opposite with respect to said first surface and suitable for facing the vehicle or the wheel of the vehicle;

and wherein said caliper body comprises at least one pin seat that opens into said first surface through a first seat opening made in said first surface and that opens into said second surface through a second seat opening made in said second surface;

said pin seat being suitable for placing said at least one first surface in communication with said at least one second surface;

and wherein said caliper body comprises a mouth portion that delimits said second seat opening;

and wherein said at least one pin comprises a pin head and a pin shank, said pin defining a longitudinal direction, coinciding with the direction of longitudinal extension of said pin shank, and a transversal direction, perpendicular to the longitudinal direction;

and wherein said pin shank is suitable for being received in said at least one pin seat through said second seat opening;

and wherein said pin shank comprises a first shank portion, suitable for being received in said at least one pin seat, when in operative conditions, and a second shank portion, suitable for projecting canti-levered with respect to said at least one first surface and facing said brake disc, when in operative conditions;

and wherein said first shank portion comprises at least one perimetric protuberance, of greater extension along the transversal direction with respect to the adjacent shank portions;

and wherein said at least one perimetric protuberance is suitable for forming a friction-fit between said first shank portion and said pin seat;

and wherein said pin head comprises at least one underhead portion that extends from said pin head towards said pin shank to form a collar;

and wherein said first shank portion comprises at least one groove, arranged between said collar and said perimetric protuberance, said groove forming a recessed shank portion, of shorter extension along the transversal direction with respect to the extension along the transversal direction of said collar and with respect to the extension along the transversal direction of said at least one perimetric protuberance;

and wherein said collar is suitable for upsetting, during the step of press-fitting said pin in said pin seat, said mouth portion of said caliper body in said groove so as to form, through deformation of said mouth portion, a locking tooth suitable for cooperating with said groove to lock said at least one pin in said at least one pin seat.

2. The caliper assembly according to claim 1, wherein exclusively said at least one perimetric protuberance is suitable for forming a friction-fit between said first shank portion and said pin seat; and/or wherein said at least one perimetric protuberance is made adjacent to said groove, in said first shank portion; and/or wherein said at least one perimetric protuberance is knurled or worked through knurling, and is suitable for forming a form-friction-fit through a deformation of at least one portion of said pin seat; and/or wherein said perimetric protuberance is worked through ribbing, and is suitable for forming a form-friction-fit through a deformation of at least one portion of said pin seat; and/or wherein said at least one perimetric protuberance is at least one portion of a rounded surface of said first shank portion, suitable for forming a friction-fit with a portion of said pin seat; and/or wherein said deformation of said mouth portion of said pin seat is an elasto-plastic deformation; and/or wherein the volume occupied by said collar substantially corresponds to the volume of said groove so that the material deformed by upsetting by said collar and locked by said at least one perimetric protuberance flows in said groove to form said locking tooth.

3. The caliper assembly according to claim 1, wherein said first shank portion comprises a further perimetric protuberance, so as to comprise at least two perimetric protuberances, disconnected from one another; and/or wherein a first perimetric protuberance is arranged in an adjacent shank portion with respect to said groove on the opposite side of said collar substantially close to said second opening and a second perimetric protuberance is arranged close to said first opening of said pin seat; and/or wherein at least one perimetric protuberance of said at least two perimetric protuberances is knurled or worked through knurling, and is suitable for forming a form-friction-fit through a deformation of at least one portion of said pin seat; and/or wherein at least one perimetric protuberance of said at least two perimetric protuberances is worked through ribbing, and is suitable for forming a form friction fit through a deformation of at least one portion of said pin seat; and/or wherein at least one perimetric protuberance of said at least two perimetric protuberances is at least one portion of a rounded surface of said first shank portion, suitable for forming a friction-fit with a portion of said pin seat; and/or wherein said collar has a greater extension in the transversal direction than the extension in the transversal direction of said at least one perimetric protuberance; and/or wherein said second perimetric protuberance has a shorter extension in the transversal direction than the extension in the transversal direction of said first perimetric protuberance;

said at least one perimetric protuberance is a single protuberance that extends along the entire said first shank portion; and/or wherein said single protuberance is entirely knurled.

4. The caliper assembly according to claim 1, wherein said locking tooth is positioned, in the longitudinal direction undercut with respect to said at least one protuberance; and/or wherein
  said mouth portion of said caliper body is made from tougher material with respect to said pin shank and to said collar; and/or wherein
  said pin shank and said collar are made from harder material with respect to said mouth portion of said caliper body.

5. The caliper assembly according to claim 1, wherein at least one portion of said pin shank is substantially cylinder-shaped with a substantially circular base; and/or wherein
  said under-head portion is substantially discoid shaped, to form said collar; and/or wherein
  said at least one perimetric protuberance has a substantially annular shape; and/or wherein
  said rounded surface of said at least one perimetric protuberance has a substantially toroidal shape.

6. The caliper assembly according to claim 1, wherein at least one from said first elongated portion and said second elongated portion of said caliper body is suitable for receiving at least one brake pad;
  and wherein said at least one pin is suitable for being used as a resting pin, suitable for forming an abutment for at least one abutment surface of said at least one brake pad; and/or wherein
  said second shank portion of said pin is suitable for being inserted with clearance in an eyelet made on a brake pad so as to form a sliding guide for the pad, when it abuts against one of said braking surfaces of the brake disc; and/or wherein
  said at least one pin is suitable for working by bending, when in operating conditions.

7. The caliper assembly according to claim 1, wherein each of said first elongated portion and said second elongated portion of said caliper body is suitable for receiving at least one brake pad, so that said assembly comprises at least two brake pads and at least four pins; and/or wherein
  said at least four pins are press-fitted so that said second shank portion of each of said at least four pins projects canti-levered substantially close to abutment surfaces of said at least two brake pads, so that, when in operative conditions, said at least four pins are suitable for forming an abutment, for said at least two brake pads; and/or wherein
  said at least four pins are press-fitted so that said second shank portion of each of said at least four pins is inserted in a pad eyelet of said at least two brake pads, so that, when in operative conditions, said at least four pins are suitable for forming a sliding guide, for said at least two brake pads.

8. A method for press-fitting a pin in a caliper body, comprising the following steps:
  providing a caliper assembly according to claim 1;
  inserting said pin shank in said pin seat from said second seat opening;
  exerting a press-fitting action (F) on said pin head, so as to deform said mouth portion, so that it forms a locking tooth.

9. The method according to claim 8, comprising the step of providing press-fitting equipment, which allows said two elongated bodies to be connected, said press-fitting equipment comprising:
  at least one press-fitting tool, suitable for transmitting the press-fitting action (F) to said pin head;
  at least one support element suitable for being arranged between at least one portion of said at least one first surface of said first elongated portion and at least one portion of said at least one first surface of said second elongated portion, so as to limit, during the press-fitting step, the deformation of said caliper body;
  at least one support plane, suitable for allowing at least one portion of at least one second surface of at least one from said first elongated portion and said second elongated portion of said caliper body to rest thereupon, during the press-fitting step.

10. The method according to claim 8, comprising at least one of the following further steps:
  inserting said support element between said first elongated portion and said second elongated portion of said caliper body;
  and/or inserting said support element between at least one portion of said at least one first surface of said first elongated portion and at least one portion of said at least one first surface of said second elongated portion;
  and/or providing said pin seat in said first elongated portion of said caliper body;
  and/or resting said second elongated portion on said support plane;
  and/or inserting said pin shank in said pin seat provided in said first elongated portion of said caliper body;
  and/or exerting the press-fitting action (F) on said pin head through said press-fitting tool;
  and/or minimising, through said support element, the torque generated by said press-fitting action (F) on said caliper body;
  and/or providing said pin seat in said second elongated portion of said caliper body;
  and/or inverting said caliper body;
  and/or resting said first elongated portion on said support plane;
  and/or inserting said pin shank in said pin seat provided in said second elongated portion of said caliper body.

* * * * *